Figure 1:
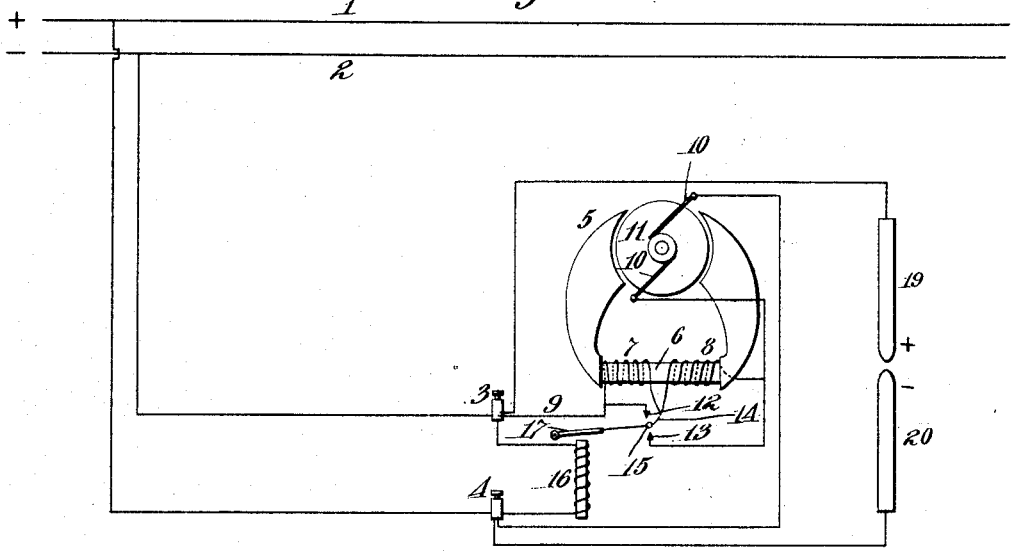

No. 618,509. Patented Jan. 31, 1899.
E. P. HOPKINS.
CARBON FEEDING MECHANISM.
(Application filed Mar. 21, 1898.)
(No Model.) 4 Sheets—Sheet I.

Witnesses:
Jas. F. Coleman
Frank L. Dyer

Inventor
Edward P. Hopkins
By Rich'd N. Dyer Att'y.

No. 618,509. Patented Jan. 31, 1899.
E. P. HOPKINS.
CARBON FEEDING MECHANISM.
(Application filed Mar. 21, 1898.)
(No Model.) 4 Sheets—Sheet 2.
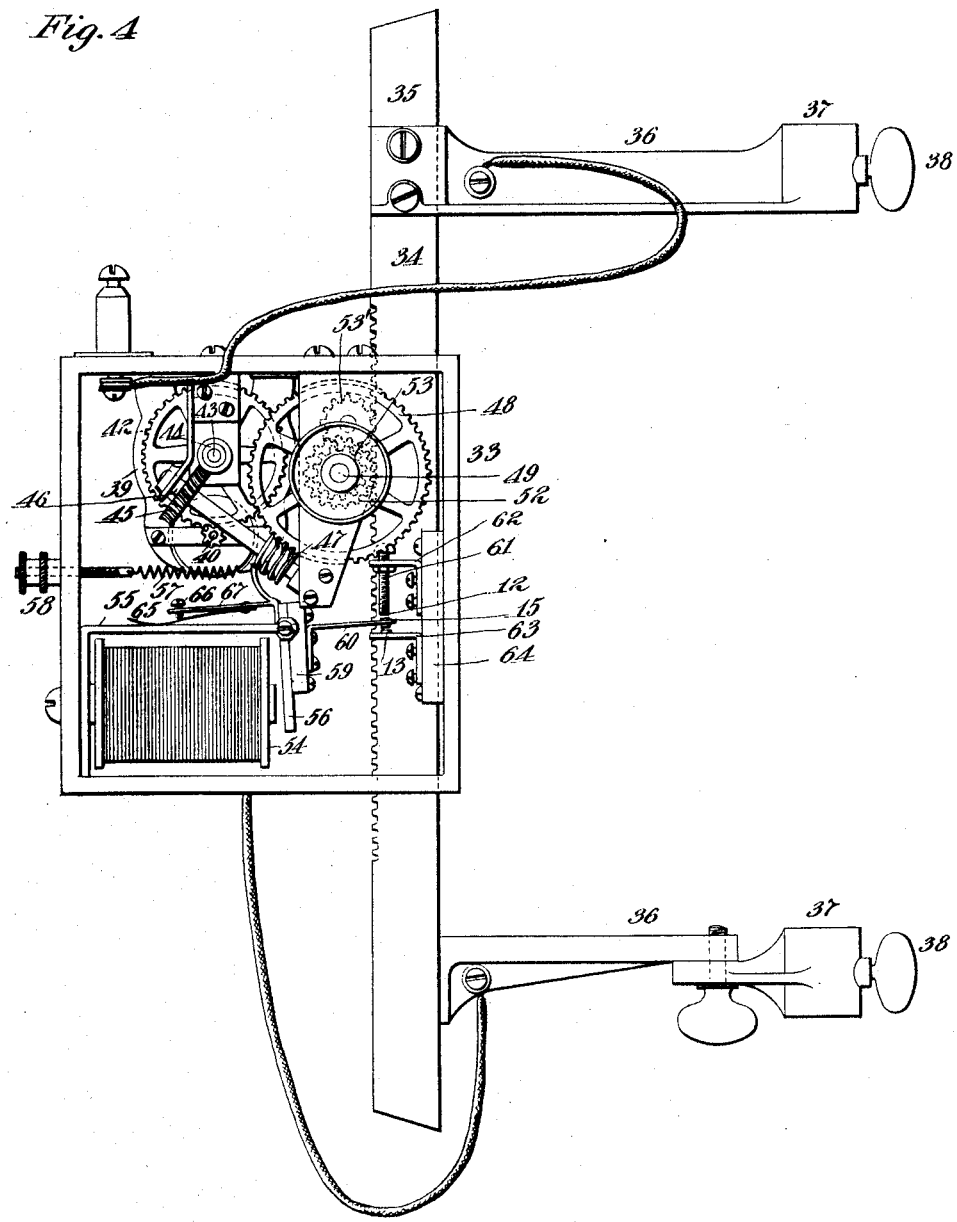

No. 618,509. Patented Jan. 31, 1899.
E. P. HOPKINS.
CARBON FEEDING MECHANISM.
(Application filed Mar. 21, 1898.)
(No Model.) 4 Sheets—Sheet 3.
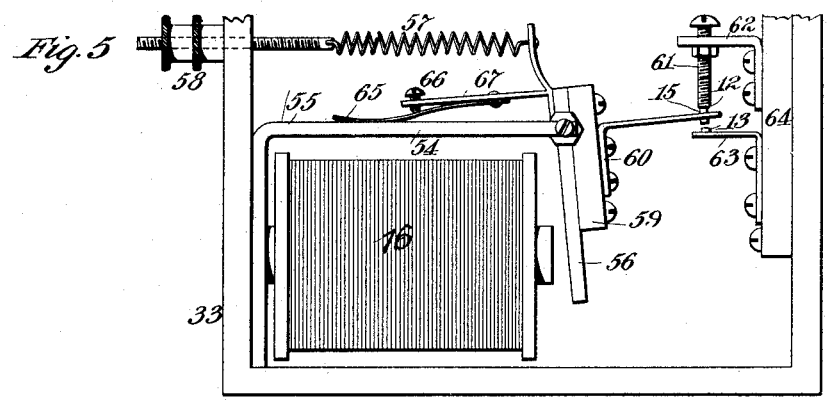
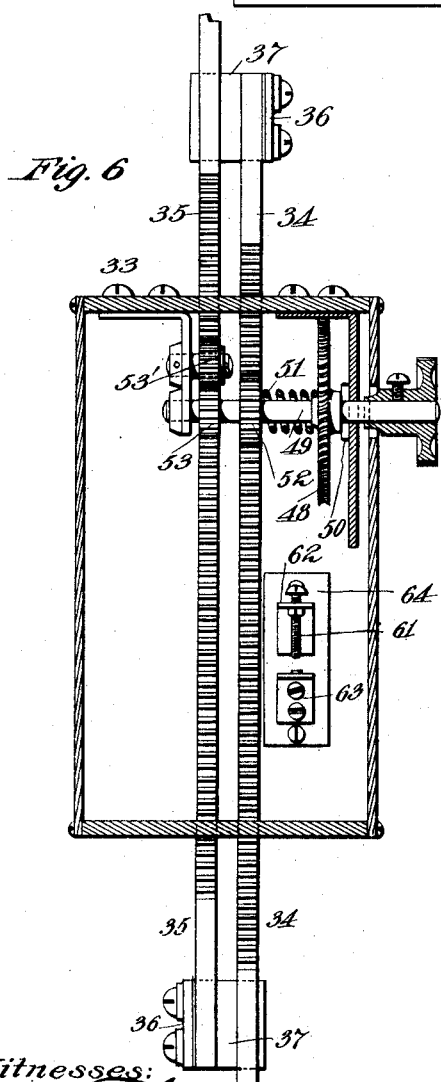
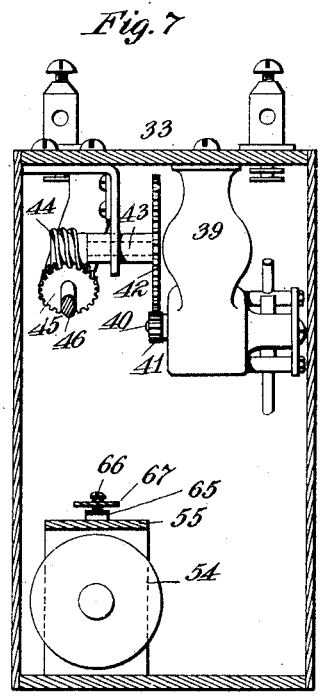

No. 618,509. Patented Jan. 31, 1899.
E. P. HOPKINS.
CARBON FEEDING MECHANISM.
(Application filed Mar. 21, 1898.)

(No Model.) 4 Sheets—Sheet 4.

Witnesses:
Jas. F. Coleman
Frank L. Dyer

Inventor
Edward P. Hopkins
By Rich'd N. Dyer
Att'y.

THE NORRIS PETERS CO., PHOTO-LITHO., WASHINGTON, D. C.

UNITED STATES PATENT OFFICE.

EDWARD POWELL HOPKINS, OF NEW YORK, N. Y.

CARBON-FEEDING MECHANISM.

SPECIFICATION forming part of Letters Patent No. 618,509, dated January 31, 1899.

Application filed March 21, 1898. Serial No. 674,555. (No model.)

*To all whom it may concern:*

Be it known that I, EDWARD POWELL HOPKINS, a subject of the Queen of Great Britain, residing at New York city, in the county and State of New York, have invented certain new and useful Improvements in Carbon-Feeding Mechanism, of which the following is a specification.

My invention relates to improved mechanism for feeding one or more carbons which are consumed by an electric arc—such, for example, as in arc-lamps or electric reducing-furnaces.

In the operation of electric reducing-furnaces—such, for example, as in the manufacture of carbid of calcium from coke and lime—it is customary to employ a crucible of graphite, into which is introduced the positive carbon or a bunch of positive carbons, a suitable negative carbon or bunch of negative carbons being introduced through the bottom of the crucible, or instead thereof a single negative carbon in the form of a disk being placed in the bottom of the crucible and on which the reduced material will be built up roughly in the form of a cone. With such furnaces, wherein the heating effect is produced by the arc formed between the positive and negative carbons, it of course becomes necessary to provide means, preferably of an automatic character, by which as the resistance of the arc increases the carbons may be fed together to lower the resistance to the normal point, and automatic means by which this result is accomplished have been used in electric reducing-furnaces of this type. It is found, however, that in introducing the charge within the crucible during the operation it very frequently happens that the arc may be short-circuited through the crucible, and hence it is desirable to provide means by which in the event of the resistance of the arc being decreased below the normal point the carbons will be separated, so as to increase the resistance of the arc to that point. In order that the best results may be obtained and that an electric reducing-furnace may operate to the best advantage, it is desirable that the means by which the positive carbon or carbons shall be controlled to maintain the arc approximately constant shall be very sensitive in character. With furnaces of the type referred to as used on a commercial scale the positive carbon or carbons are of relatively large mass, so that it becomes necessary to employ mechanism for controlling them which while being of a sensitive character will yet be of sufficient power to rapidly shift the carbon or carbons for the maintenance of a practically constant arc.

The improved carbon-controlling mechanism which I have invented has been designed expressly with reference to electric reducing-furnaces of the type referred to, and by its use carbons of large mass can be accurately, rapidly, and sensitively controlled, the mechanism resulting in the maintenance of an arc which at all times will be of a practically uniform resistance. The invention is, however, capable of other uses—such, for instance, as a feed mechanism for constant-potential arc-lamps, such as might be used in inaccessible places, as in the flies or galleries of theaters, in lighthouses, &c. When used with an arc-lamp, the mechanism will maintain a delicate and perfect feed at all times, and the lamp will immediately and automatically put itself into operation upon the closing of the circuit through the lamp whether the carbons are actually in contact or whether they are separated to any extent. When used with arc-lamps, therefore, the improved feeding mechanism possesses the advantage that no striking-magnet is necessary.

In carrying out my invention I employ an electric motor of the desired capacity series-wound and with double field-coils, said field-coils being oppositely wound and with exactly the same ampere-turns. The field-coils are in series with each other and in series or multiple arc with the motor-armature, and the field-coils and motor-armature are included in a shunt across the line. Included in a second shunt across the line is a high-resistance controlling-magnet the armature of which is adapted on its attracted and unattracted movement to short-circuit one or the other of the motor-coils. The armature of the motor is connected through suitable mechanical devices to the positive carbon or carbons and, if desired, to the negative carbon or carbons also, as is common in stereopticon or projecting arc-lamps. Provision will be preferably made by which the positive carbon or both carbons, if both are movable, may be operated by hand with a rapid feed to facilitate the introduction of the carbons into the holders and to manipulate them for initially striking the arc; but a hand feed mechanism is not an indispensable feature of my invention, since, as stated, the carbons will automatically feed themselves to maintain an arc of normal resistance whether the arc is primarily of greater or less resistance. In order to prevent the armature of the regulating shunt-magnet from keeping in constant vibration to run the motor first in one direction and then in the other without cessation, I provide thereon an adjustable counteracting-spring which opposes the action of the retractile spring of the armature when the armature has been moved to a position midway between the short-circuiting stops of the two field-coils, whereby upon the decrease of the resistance of the arc tending to decrease the effect of the shunt-magnet the armature of the latter, instead of being immediately moved by its retractile spring to short-circuit the operating field-coil, will be maintained by the effect of the counteracting-spring in the midway position to hold the motor at rest, and the motor will reverse its direction of rotation only when the shunt-magnet has been sufficiently weakened to allow the retractile spring to overcome the effect of the counteracting-spring.

The objects of my invention are to provide a feeding mechanism for a carbon or carbons or one or more bunches of carbons which will be simple in construction, which will be capable of use with carbons of large mass wherein there will be but little sparking and by which at all times an arc of practically uniform resistance will be maintained in the apparatus with which it is used, whether an arc-lamp, an electric reduction-furnace, or any other device requiring a feeding mechanism.

A motor employing two field-coils oppositely wound and of the same number of ampere-turns in series with each other, combined with a shunt-regulating magnet the armature of which is adapted to short-circuit either one of the field-coils, and a counteracting-spring being employed to maintain the said armature in a midway position until the shunt-magnet is sufficiently weakened to allow the retractile spring of the armature to short-circuit one of the field-coils, whereby upon the decrease in resistance of the arc, resulting in a decrease in current in the shunt-magnet, the armature thereof in breaking the short-circuit of the operative field-coil will, instead of being immediately moved to short-circuit the other field-coil, be maintained in such midway position, is, so far as I know, entirely novel, and I shall claim the same broadly.

There are other features of novelty in the invention which will be more clearly pointed out as its construction and mode of operation are particularly explained hereinafter.

In order that my invention may be better understood, attention is directed to the accompanying drawings, forming a part of this specification, and in which—

Figure 2:
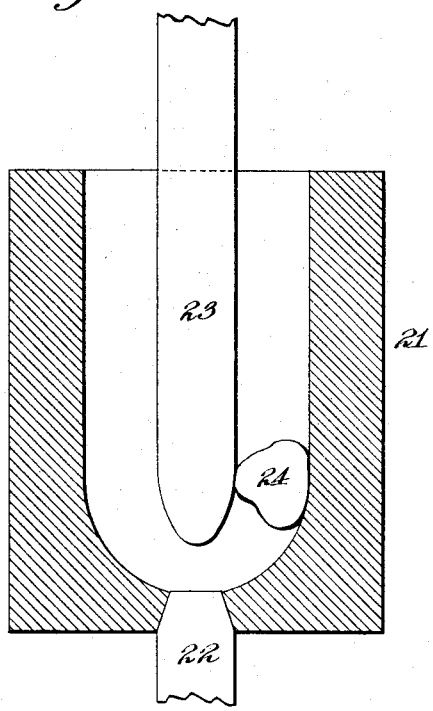
Figure 3:
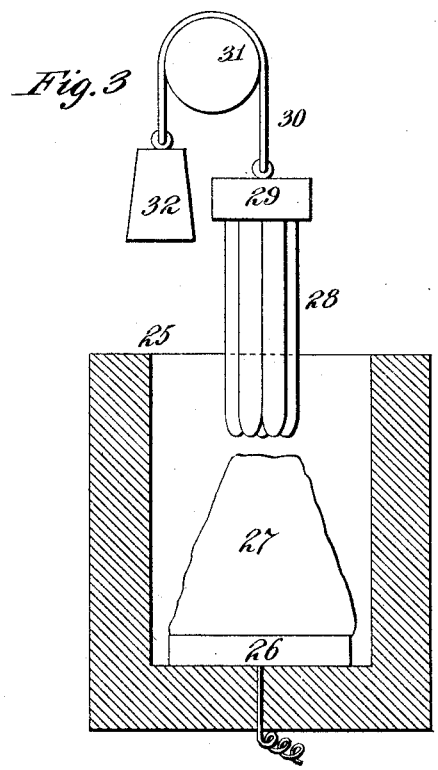
Figure 8:
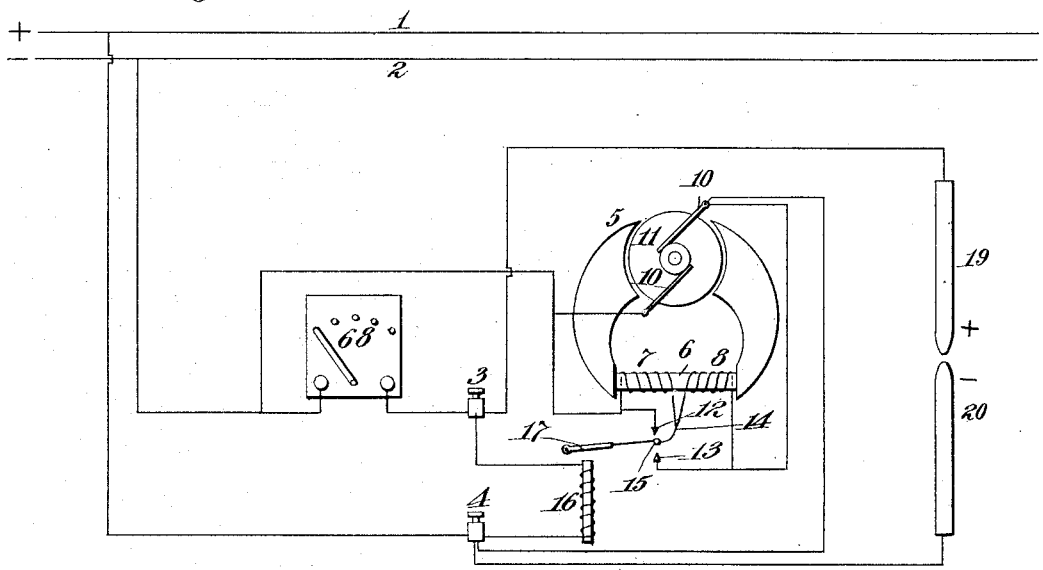

Figure 1 is a diagrammatic view illustrating the principle of operation of the improved electric motor and illustrating circuit connections by which the said motor will serve to operate the carbon or carbons of a device wherein an electric arc is employed for purposes of light or heat, the device in practice being such that the arc is liable to decrease and to increase in its resistance. Fig. 2 is a diagrammatic sectional view of a well-known form of electric reducing-furnace, illustrating conditions under which the arc is liable to be short-circuited and wherein a motor connected as illustrated in Fig. 1 will be used; Fig. 3, a similar view of another form of electric reducing-furnace to which my present invention may be applied and wherein only the positive carbon or carbons may be moved; Fig. 4, a side view of an arc-lamp equipped with my improved feeding mechanism and wherein both the positive and negative carbons are fed to maintain the arc in practically the same plane, the cover of the inclosing casing being removed, as is required for projecting or stereopticon purposes; Fig. 5, a detached view of the shunt-magnet, its armature, the short-circuiting stops, retractile spring, and its counteracting-spring; Fig. 6, a sectional view taken through the pinion-shaft for operating the carbon-racks and illustrating the hand feed mechanism; Fig. 7, a section through the motor-shaft; Fig. 8, a diagrammatic view illustrating a motor the armature of which is connected in multiple arc with the field-coils and showing a regulating-rheostat by which the current through the apparatus may be adjusted and by which also the motor will be caused to operate to separate the carbons even when the carbons are pressed tightly together to form a short circuit and Fig. 9 a similar view showing the employment of a permanent resistance for preventing the existence of such a short circuit from maintaining the motor at rest.

In all the above views corresponding parts are represented by the same numerals of reference.

Referring first to Fig. 1, 1 2 represent the two main conductors of a constant-potential circuit. 3 and 4 are two binding-posts connected to the mains 1 2. 5 is an electric motor of any desired construction, that illustrated being provided with a single field-bobbin 6. 7 and 8 are two field-coils oppositely wound on the bobbin 6. For purposes of clearness I illustrate the two field-coils as being arranged side by side, but preferably they will be wound together on the field-bobbin, so that each coil will extend the entire length thereof. The oppositely-wound field-coils 7 and 8 are each of the same number of ampere-turns and are placed in series, as shown, in a shunt 9 across the binding-posts 3 4, whereby the said field-coils will neutralize each other, as will be understood. The field-coils 7 and 8 are illustrated in Fig. 1 as being in series with the brushes 10 10 of the armature 11 of the motor. If desired, the field-coils 7 and 8 may be arranged in multiple arc with the motor-armature, as shown in Fig. 8. In order to provide for a reversal of the armature 11, I short-circuit either one of the field-coils 7 8. Two short-circuiting stops 12 and 13 are illustrated, either of which may be connected in circuit with a wire 14, connected to opposite ends of the two field-coils and to a contact-piece 15, made preferably of platinum. The contact 15 may be moved into engagement with either of the short-circuiting stops 12 or 13 in any suitable way, such as by hand or automatically—as, for instance, by means of a fine-wound shunt-magnet 16, connected across the binding-posts 3 and 4, the armature 17 thereof being connected with the contact-piece 15.

The motor 5, connected as described, may be used for any desired purpose, two carbons 19 and 20 being shown for purposes of illustration. The armature 11 of the motor may be connected in any suitable way to one or both of these carbons. Assuming the motor to be used in connection with a device using a carbon which requires to be used for the purpose of maintaining an arc of uniform resistance, the operation will be as follows: Normally the two field-coils 7 and 8 will receive the current through the shunt 9 and will neutralize each other, so as to maintain the motor-armature at rest, the arc being of the desired normal resistance. If the resistance of the arc increases, the current energizing the shunt-magnet 16 will increase, affecting the armature 17 and engaging the contact-piece 15 with the stop 13, so as to short-circuit the field-coil 8. The field-coil 7 will therefore act to energize the field-magnets of the motor, and the armature will rotate in the desired direction to feed the carbons together and reduce the resistance of the arc to the normal point. If, however, the resistance of the arc is below the normal resistance, the current energizing the shunt-magnet 16 will be decreased, allowing its armature to be retracted by a suitable retractile spring and engaging the contact-piece 15 with the stop 12 to short-circuit the field-coil 7. The field-coil 8 will therefore oppositely energize the field-magnets, and the direction of rotation of the armature 11 will be reversed to separate the carbons until the normal resistance of the arc is obtained.

By constructing the motor with two field-coils oppositely wound and of the same number of ampere-turns, the field-coils being normally in series with each other, whereby they neutralize each other to maintain the motor-armature at rest, and by employing short-circuiting stops for short-circuiting either one of the field-coils I provide an electric motor which is capable of being rapidly reversed and wherein only two stationary contacts are employed. By simply short-circuiting one of the field-coils of the motor for effecting reversal thereof I also reduce sparking at the contacts to a minimum not only because the current broken at the short-circuiting stops is slight, but because the two field-coils in the operation of breaking the circuit at either of the stops tend to neutralize each other and prevent one or the other of said field-coils from operating as a sparking-coil.

A motor constructed as I have indicated is capable of many uses, and in the drawings I illustrate two commercial types of devices with which it may be conveniently employed.

The electric reducing-furnace illustrated in Fig. 2 comprises a crucible 21, made generally of graphite. A negative carbon 22 extends up through an opening in the bottom of the crucible 21, and a positive carbon 23 extends down into the crucible, so that an arc will be formed between the said carbons. These carbons are of a large cross-sectional area, depending, of course, upon the capacity of the furnace. A motor constructed as I have indicated and combined with a regulating shunt-magnet is connected either to the carbon 23 or to both carbons by any suitable mechanical devices. In the manufacture of calcium carbid from a mixture of coke and lime I find that in introducing the charge into the furnace portions of the coke become wedged between the carbon 23 and the sides of the crucible above the arc, as illustrated roughly at 24, tending to short-circuit the arc through the crucible. When this happens, it is now the custom with these furnaces to elevate the positive carbon 23 by hand, so that the arc will be formed either between the carbon 23 and the negative carbon 22 or between the carbon 23 and the charge in the crucible. With my invention, however, it will be seen that in the event of a short-circuit of the arc the shunt-magnet 16 will be deenergized, short-circuiting the field-coil 7, and the motor will operate in a proper direction to automatically elevate the carbon 23 for the restoration of the arc. On the other hand, if the resistance of the arc increases by the consumption of the carbon or by the settling of the charge in the crucible the regulating shunt-magnet 16 will be energized, short-circuiting the field-coil 8 and reversing the rotation of the motor-armature to feed the carbon 23 downward to reduce the resistance of the arc to the normal point.

In Fig. 3 I illustrate another type of electric reducing-furnace with which my invention may be utilized, it comprising a crucible 25, on the bottom of which is placed a negative carbon 26 in the form of a flat disk, on which the calcium carbid or other material obtained will be built up at 27 roughly in the form of a cone. Instead of employing a single positive carbon a series of carbon-rods 28 are used, connected to a clamp 29, supported by a chain 30, running over a pulley 31 and having a counterbalance-weight 32. The motor provided with the proper regulating means will be connected to the pulley 31 or directly to the positive carbons in any suitable way.

In Figs. 4 to 7 I illustrate my improved carbon-feeding device for use with a stereopticon arc-lamp wherein both carbons are fed for the maintenance of the arc in the same plane; but obviously the invention may be used in arc-lamps wherein only the positive carbon is operated. 33 represents a suitable rectangular casing containing the controlling mechanism and provided with a cover. (Not shown.) Working in slots in the top and bottom of the casing are two racks 34 and 35, each carrying a horizontal arm 36, formed at its end with a sleeve 37, in which the carbons are received, a set-screw 38 clamping the carbon in place. Mounted within the casing 33 is the electric motor 39 of any suitable type and having two field-coils thereon oppositely wound and of the same number of ampere-turns, as explained. The mechanical connection between the motor 39 and the racks 34 and 35 may be of any desired construction, but that illustrated is compact and effective for the purpose. The motor-shaft 40 carries a pinion 41, engaging a gear 42 on a shaft 43, to which is keyed a worm 44, engaging a worm-gear 45, mounted on a shaft 46, which operates a worm 47, engaging a worm-gear 48 on a shaft 49. The several shafts are supported by suitable brackets carried within the casing 33. The worm-gear 48 is connected to the shaft 49 by a friction connection, so that the worm-gear will rotate the shaft; but the shaft may operate independent of the gear. To accomplish this end, I arrange the worm-gear 48 beneath a pin 50 and press the gear against said pin by means of a spring 51, the other end of said spring engaging a pinion 52, which meshes with and drives the rack 34, carrying the positive carbon. A smaller pinion 53 behind the pinion 52 engages with a second pinion 53', which drives the rack 35 for the negative carbon in the opposite direction to that of the positive-carbon carrier 34. Mounted within the casing 33 is the shunt-magnet 54, the yoke 55 of which is bent over and extends parallel with the magnet, so that the armature 56 will close the magnetic circuit. A retractile spring 57 tends to normally retract the armature 56, said spring being adjustable by means of adjusting-nuts 58 58. The armature 56 carries an insulated block 59, to which is secured a bracket 60, carrying the contact-piece 15 of Fig. 1. This contact-piece works between the two short-circuiting stops 12 and 13, the former in the specific instance comprising a screw 61, carried in a bracket 62, so as to be adjustable. The latter short-circuiting stop 13 is carried on a bracket 63, and both of these brackets are screwed to an insulated block 64, carried on one of the walls of the casing 33. In order to prevent the contact-piece 15, carried by the bracket 60, from immediately making contact with the screw 61 after leaving the short-circuiting stop 13, I employ a counteracting-spring, as explained. This spring 65 is carried by the upper end of the armature 56 and engages the yoke 55 at any desired point of movement, either immediately after the contact-piece 15 has left the short-circuiting stop 13 or when the said contact-piece is in a central position between the two short-circuiting stops. The tension of this counteracting-spring is regulated by a screw 66, carried by an arm 67; but the tension of said spring is manifestly at all times less than that of the retractile spring 57.

An arc-lamp constructed as described and using a motor connected as illustrated in Fig. 1, the principles of which have before been pointed out, will operate as follows: Normally—that is to say, when the resistance of the arc is correct—the two field-coils of the motor will be in circuit with the shunt 9 and the motor will be at rest, the counteracting-spring 65 bearing on the yoke 55, and the effect of that spring, together with the attraction of the shunt-magnet 54, serving to maintain the contact-piece 15 midway between the two short-circuiting stops. If the resistance of the arc increases by the consumption of the carbons, the shunt-magnet will be further energized, attracting its armature 56 and engaging the contact-piece 15 with the short-circuiting stop 13 to short-circuit the motor-coil 8. The armature of the motor 39 will therefore rotate in the proper direction and, through the pinion 41, gear 42, worm 44, worm-gear 45, worm 47, worm-gear 48, and pinions 52 and 53, the carbons will be moved together to restore the normal resistance of the arc. This will decrease the attraction of the shunt-magnet 54, and the contact-piece 15 will be again maintained in the midway position, so as to bring the motor to rest. If, however, the resistance of the arc decreases—as, for instance, in starting up with the carbons in contact—the shunt-magnet 54 will be sufficiently weakened to enable the retractile spring 57 to overcome the resistance of the counteracting-spring 65, and the contact-piece 15 will be engaged with the screw 61 (corresponding to the short-circuiting stop 12 of Fig. 1) to short-circuit the motor-coil 7, allowing the motor-armature to rotate in the opposite direction and through the connections described moving the carbons apart to restore the normal resistance of the arc or to strike the arc initially.

While it is desirable to provide in an arc-lamp two short-circuiting stops by means of which either field-coil may be short-circuited to allow the motor-armature to rotate in either direction to advance or separate the carbons, as in that way a lamp is obtained which does not require a striking-magnet, it will yet be understood that it will be possible and within the spirit of my invention to provide an arc-lamp for use on constant-potential circuits employing an arc-striking magnet and using only a single short-circuiting stop, whereby only one of the field-coils may be short-circuited to provide only for the feeding of the carbons together to compensate for increase in resistance at the arc, in which case the two field-coils will normally oppose each other, but only one of said field-coils will ever be operative for energizing the field-magnets to allow the motor to run.

Figure 9:
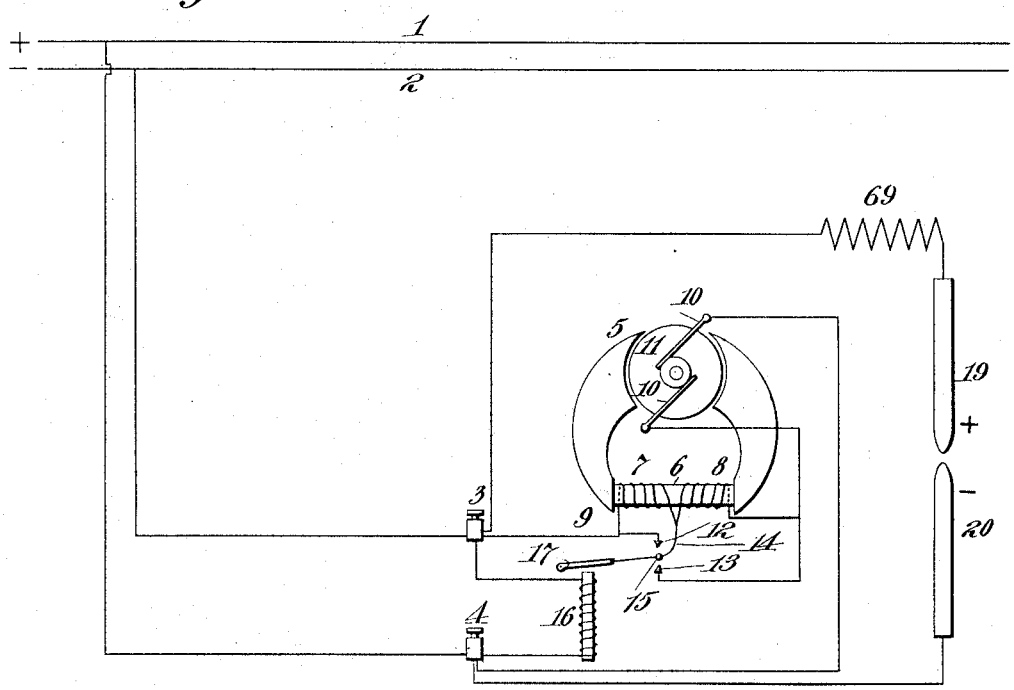

In case the two carbons of an electric lamp or other device are accidentally pressed tightly together, so as to result in a short-circuit of the line, there would be danger of an insufficient current so affecting the motor as not to result in the separation of the carbons, although under normal conditions, when the carbons are in light contact produced by their weight, such an objection would not arise. To provide, however, for the possibility of the carbons being so tightly pressed together as to practically short-circuit the motor, I may use such an arrangement as is illustrated in Figs. 8 and 9 or any other analogous arrangement by which an absolute short-circuit around the motor is prevented. In Fig. 8 I illustrate a regulating-rheostat 68, interposed between one of the connections to the motor and one of the binding-posts, whereby said rheostat will be always in series with the arc and the motor will be always in shunt across the line, so that an absolute short-circuit through the arc is prevented. By means of the rheostat 68 the supply of current to and the intensity or brilliancy of the arc may be regulated, as is now common in constant-potential arc-lamps, electric reduction-furnaces, and analogous devices. In Fig. 9 the same result is accomplished by interposing a fixed resistance 69 in series with the arc, so that even in the event of the carbons being pressed tightly together a sufficient current will be shunted through the motor to result in the separation of the carbons.

Having now described my invention, what I claim as new, and desire to secure by Letters Patent, is as follows:

1. The combination with a carbon, of an electric motor, the armature of which is connected to said carbon, two field-coils for said motor oppositely wound and of the same ampere-turns, the said field-coils being normally in series with each other, whereby the field-coils neutralize each other to maintain the motor-armature at rest, two short-circuiting stops, a contact-piece coöperating with either of said stops for short-circuiting either field-coil to operate the motor-armature in either direction, a regulating-magnet connected in shunt across the arc, an armature for said magnet connected with said contact-piece, a retractile spring for retracting said armature, and a counteracting-spring normally inactive, but operating to counteract the said retractile spring when the contact-piece occupies an intermediate position, as and for the purposes set forth.

2. The combination with a carbon, of an electric motor, the armature of which is connected to said carbon, two field-coils for said motor oppositely wound and of the same ampere-turns, the said field-coils being normally in series with each other, whereby the field-coils neutralize each other to maintain the motor-armature at rest, two short-circuiting stops, a contact-piece coöperating with either of said stops for short-circuiting either field-coil to operate the motor-armature in either direction, a regulating-magnet connected in shunt across the arc, an armature for said magnet connected with said contact-piece, a retractile spring for retracting said armature, and an adjustable counteracting-spring normally inactive, but operating to counteract the said retractile spring when the contact-piece occupies an intermediate position, as and for the purposes set forth.

3. In a constant-potential arc-lamp, the combination with the carbons, of an electric motor, the armature of which is connected to both of said carbons, two field-coils for the motor oppositely wound and of the same ampere-turns connected normally in series with each other in a shunt across the arc, two short-circuiting stops, a contact-piece adapted to engage with either of said stops for short-circuiting one or the other of the field-coils, a shunt-regulating magnet, the armature of which is connected to said contact-piece, a retractile spring for retracting said armature, and a counteracting-spring carried by the armature for counteracting the retractile spring, substantially as set forth.

4. In a constant-potential arc-lamp, the combination with the carbons, of an electric motor, the armature of which is connected to both of said carbons, two field-coils for the motor oppositely wound and of the same ampere-turns connected normally in series with each other in a shunt across the arc, two short-circuiting stops, one of said stops being adjustable, a contact-piece adapted to engage with either of said stops for short-circuiting one or the other of the field-coils, a shunt-regulating magnet, the armature of which is connected to said contact-piece, a retractile spring for retracting said armature, and a counteracting-spring carried by the armature for counteracting the retractile spring, substantially as set forth.

This specification signed and witnessed this 14th day of March, 1898.

EDWARD POWELL HOPKINS.

Witnesses:
 S. O. EDMONDS,
 FRANK L. DYER.